United States Patent [19]
Osawa et al.

[11] Patent Number: 5,803,573
[45] Date of Patent: Sep. 8, 1998

[54] ILLUMINATOR WITH LIGHT-EMITTING SURFACE

[75] Inventors: Hideharu Osawa; Kazuyoshi Tsuji, both of Kyoto, Japan

[73] Assignee: Rohm Co., Ltd., Kyoto, Japan

[21] Appl. No.: 824,358

[22] Filed: Mar. 25, 1997

[30]     Foreign Application Priority Data

May 2, 1996 [JP] Japan .................................. 8-111466

[51] Int. Cl.⁶ ........................... G01D 11/28; F21V 7/04; F21V 21/00; H01R 33/00
[52] U.S. Cl. ............................. 362/31; 362/26; 362/27; 362/31; 362/800; 362/226; 362/249
[58] Field of Search ............................. 362/26, 27, 31, 362/800, 226, 249

[56]           References Cited

U.S. PATENT DOCUMENTS

| | | | |
|---|---|---|---|
| 4,897,769 | 1/1990 | Lang ........................................ | 362/226 |
| 4,935,665 | 6/1990 | Murata .................................... | 313/500 |
| 4,975,808 | 12/1990 | Bond et al. ............................. | 362/31 |
| 5,075,824 | 12/1991 | Tan .......................................... | 362/31 |
| 5,142,454 | 8/1992 | Green ...................................... | 362/61 |
| 5,178,448 | 1/1993 | Adams et al. .......................... | 362/83.1 |
| 5,537,296 | 7/1996 | Kimura et al. .......................... | 362/31 |
| 5,550,715 | 8/1996 | Hawkins et al. ........................ | 362/31 |
| 5,558,420 | 9/1996 | Oki et al. ................................ | 362/31 |
| 5,590,945 | 1/1997 | Simms .................................... | 362/31 |
| 5,613,751 | 3/1997 | Parker et al. ........................... | 362/31 |
| 5,618,096 | 4/1997 | Parker et al. ........................... | 362/31 |

*Primary Examiner*—Ira S. Lazarus
*Assistant Examiner*—David Lee
*Attorney, Agent, or Firm*—Majestic, Parsons, Siebert & Hsue P.C.

[57]                ABSTRACT

An illuminator with a light-emitting surface includes a light-conducting plate made of a transparent or translucent resin and a light source device for projecting light into this light-conducting plate through its side surface. There is an engagement mechanism by which the light source device can be automatically attached to the side surface of the light-conducting plate by merely pressing the light source device against the side surface of the light-conducting plate. The engaging mechanism may include protrusions formed at both end parts of the light source device and a flexible and deformable hook formed on the side surface of the light-conducting plate so as to prevent the light source device from becoming removed from or moving perpendicularly relative to the light-conducting plate when they are in engaged relationship.

6 Claims, 10 Drawing Sheets

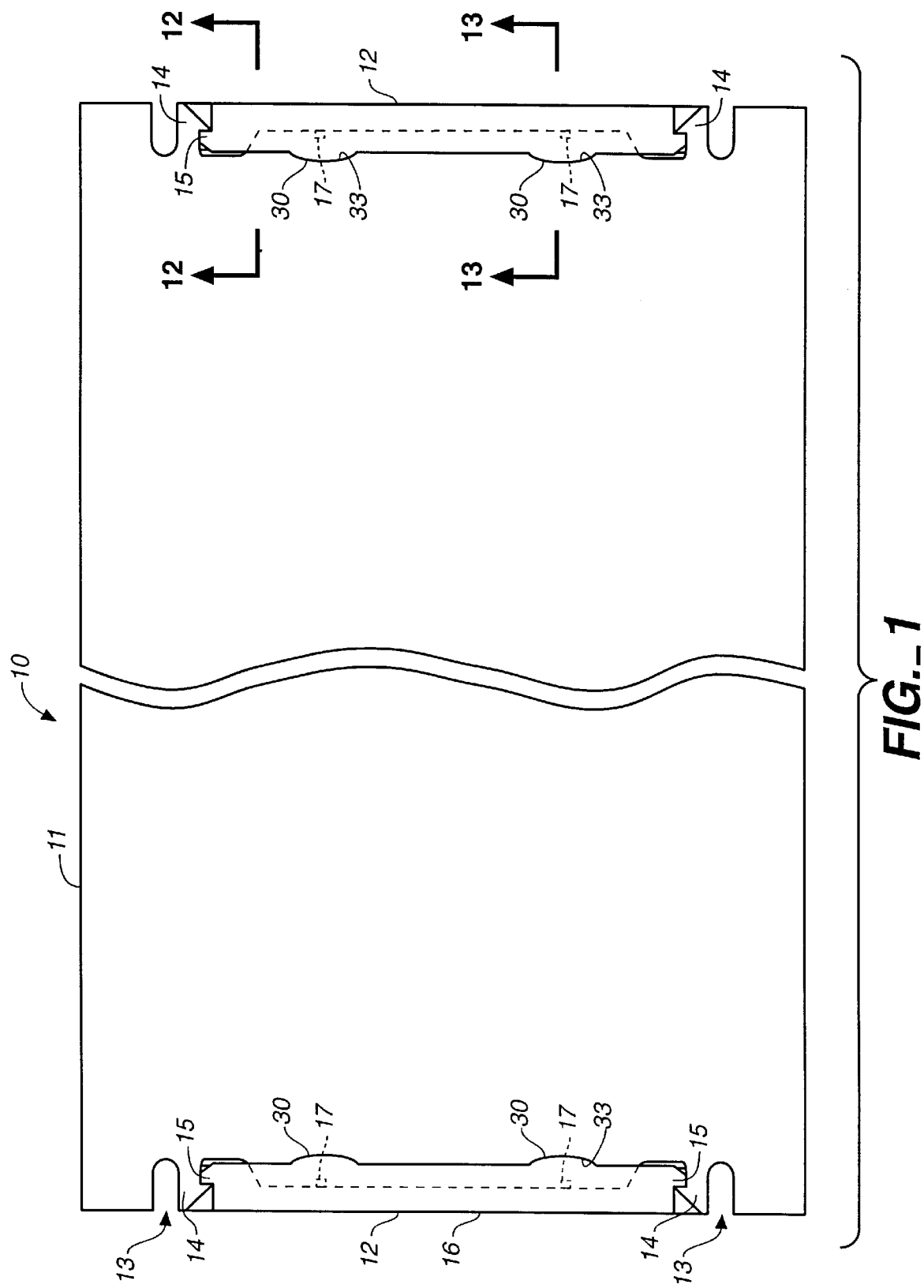

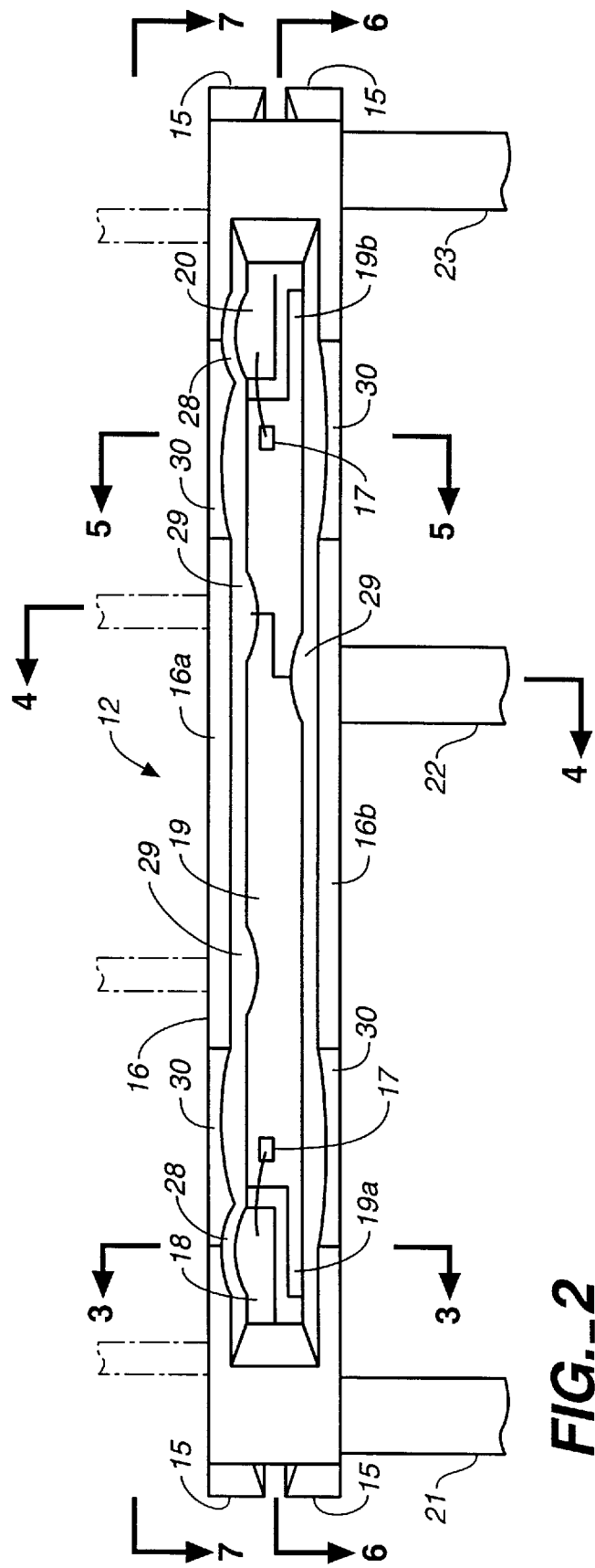
FIG._2

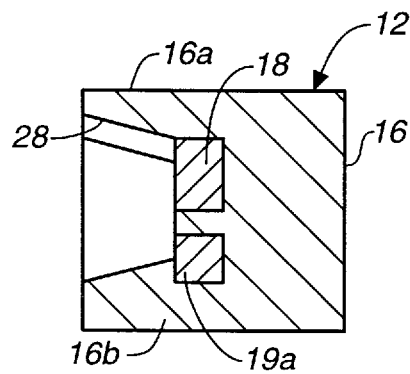
FIG._3
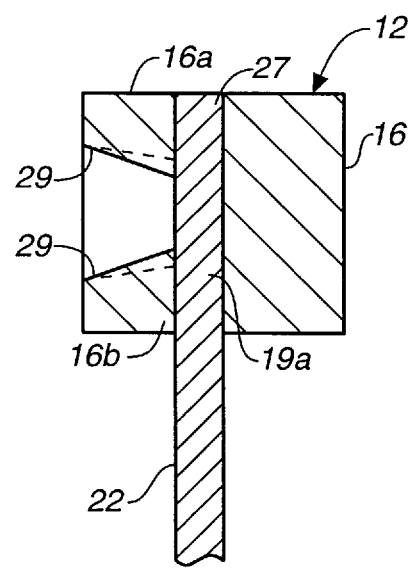
FIG._4
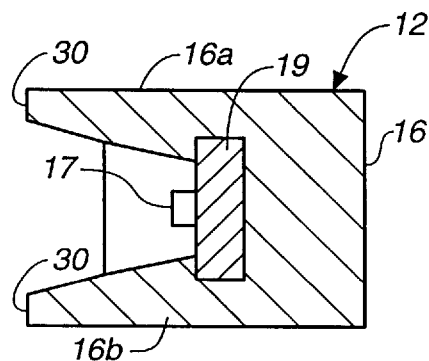
FIG._5

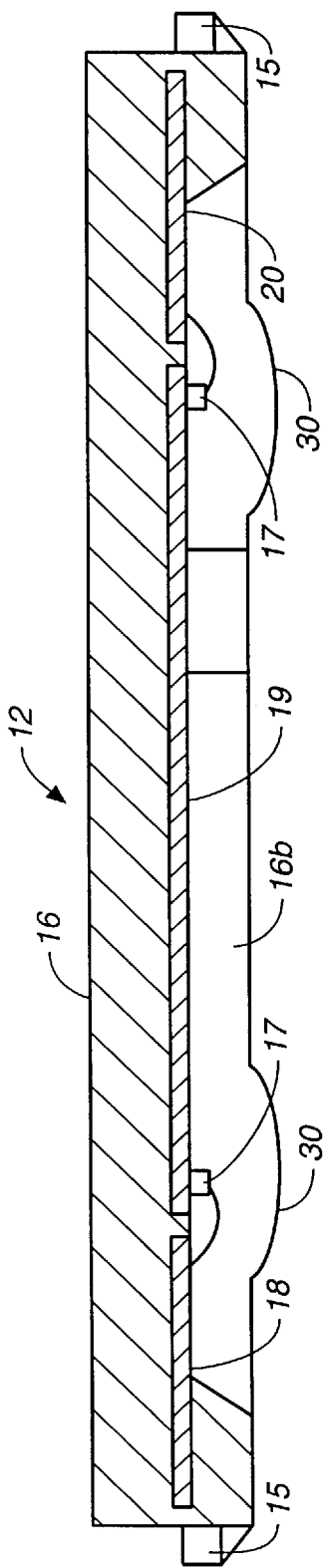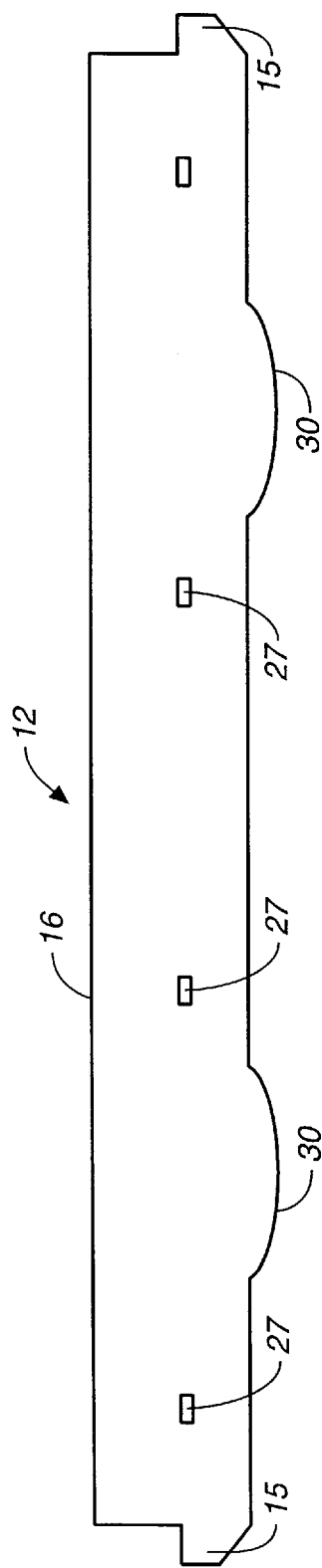

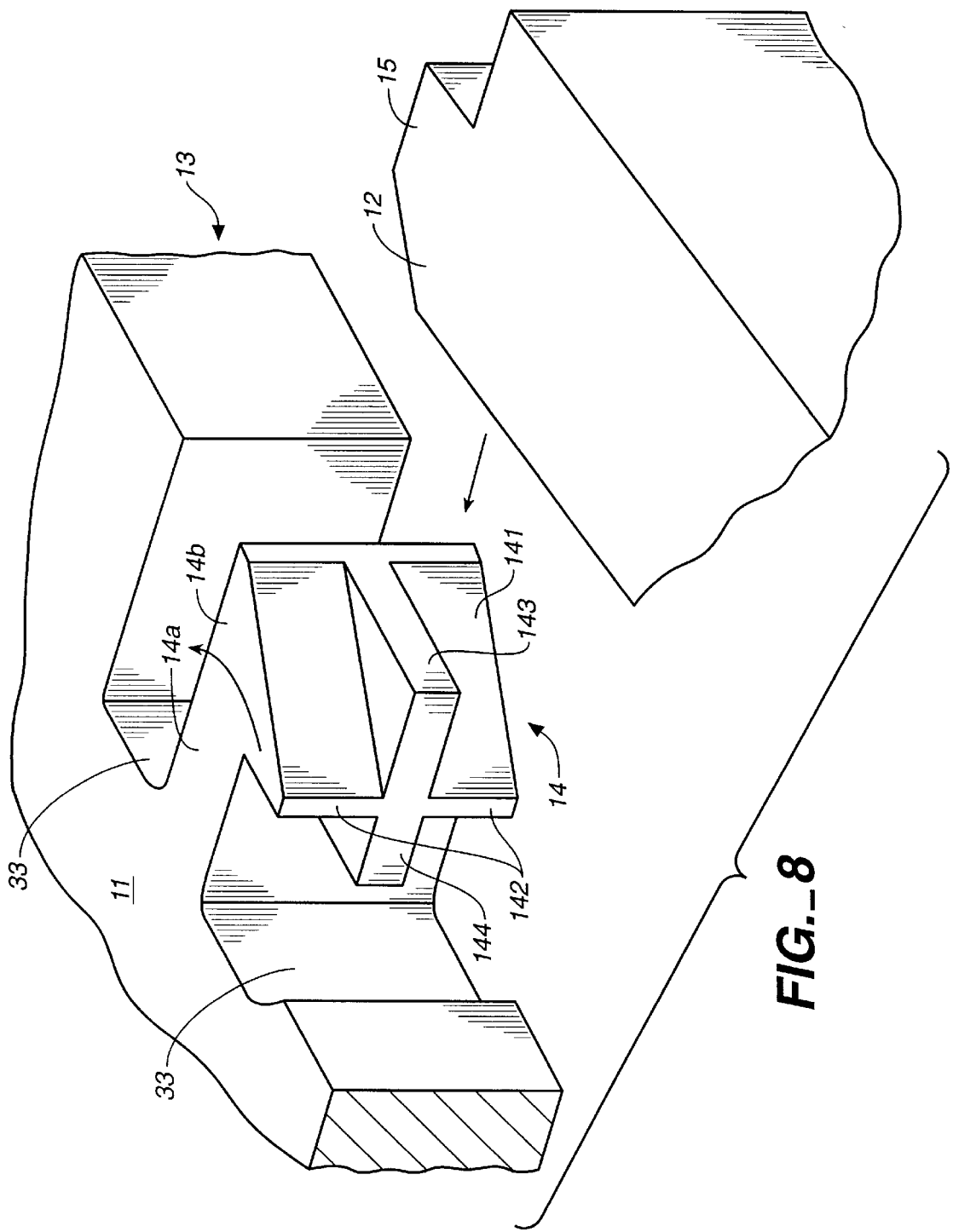

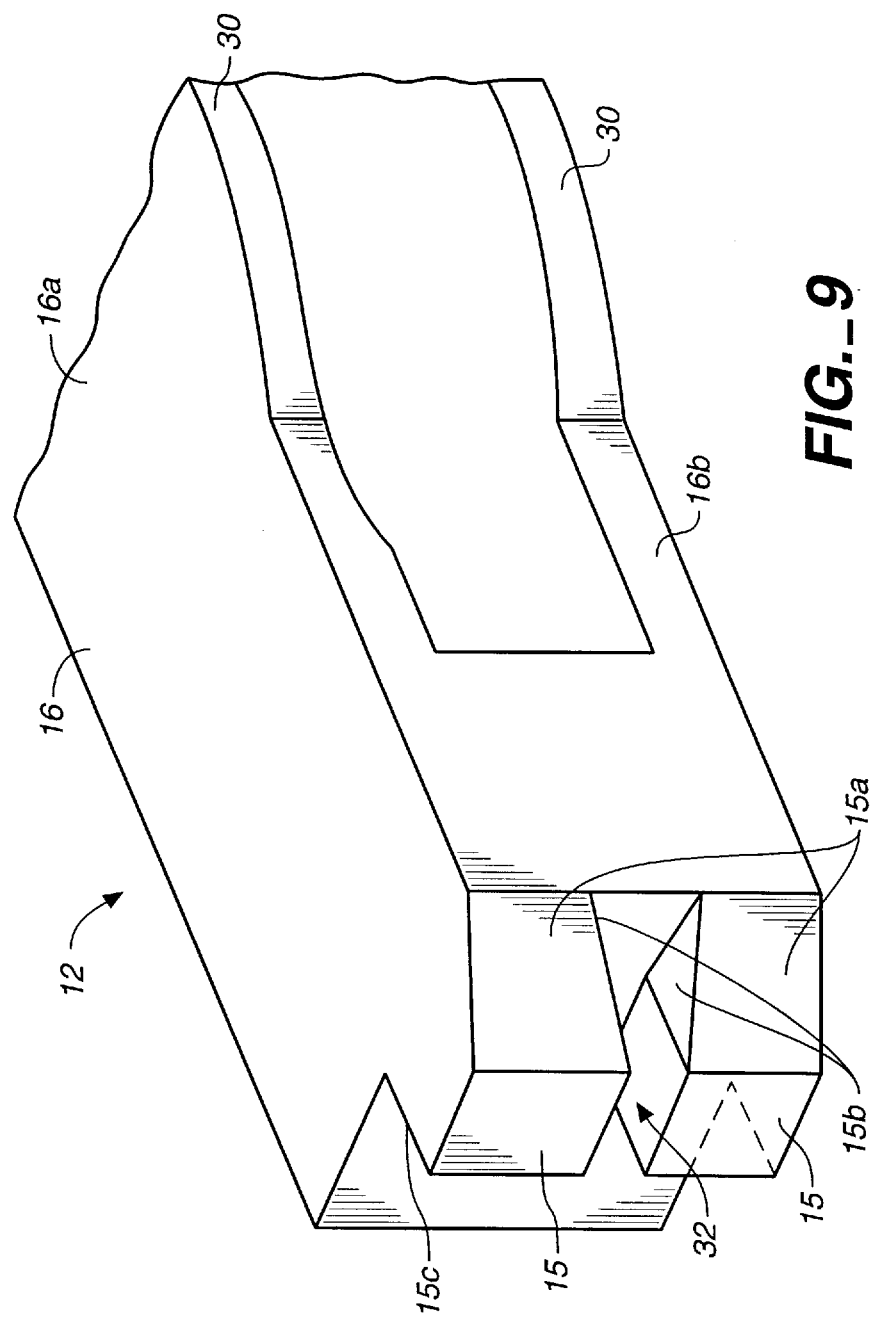

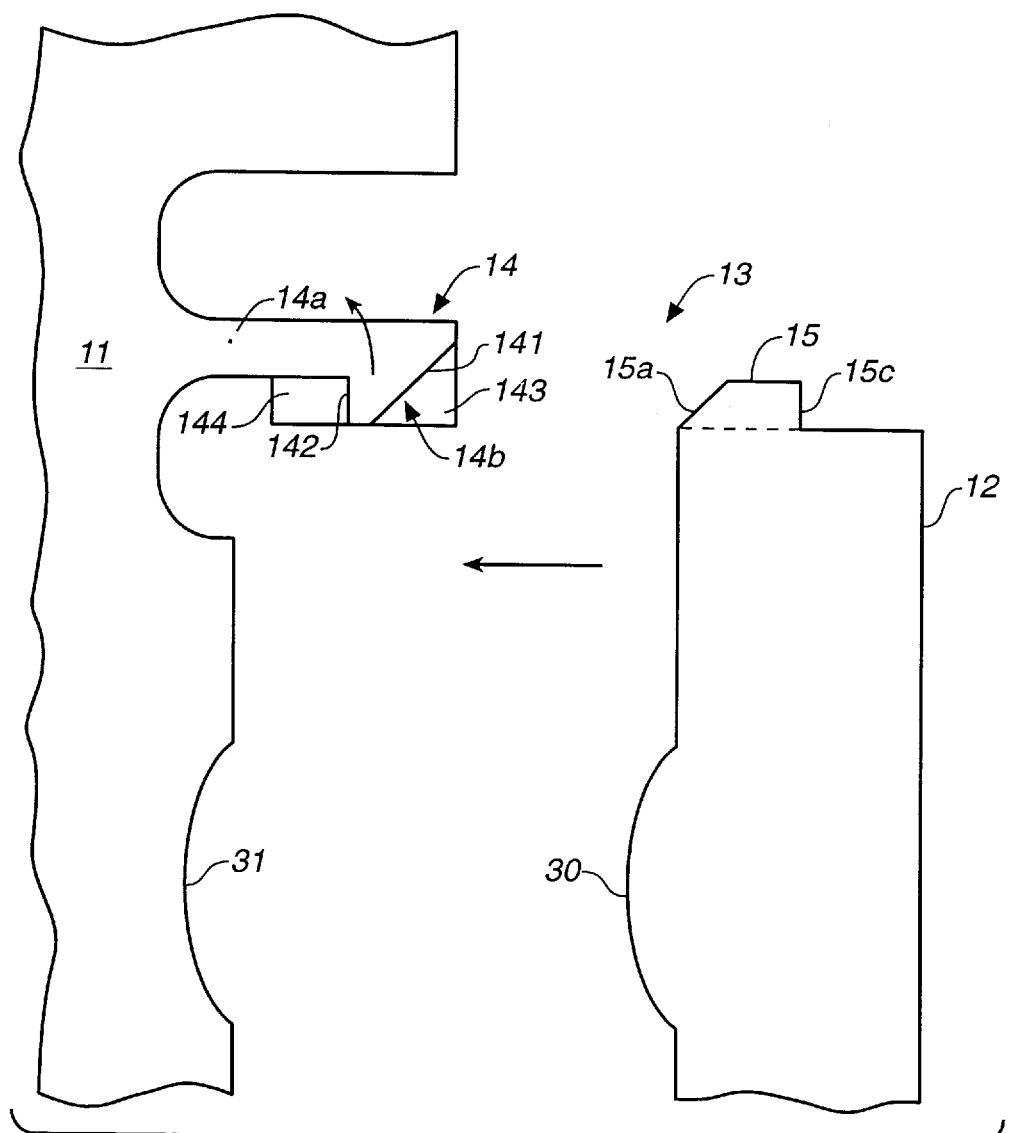
FIG._10

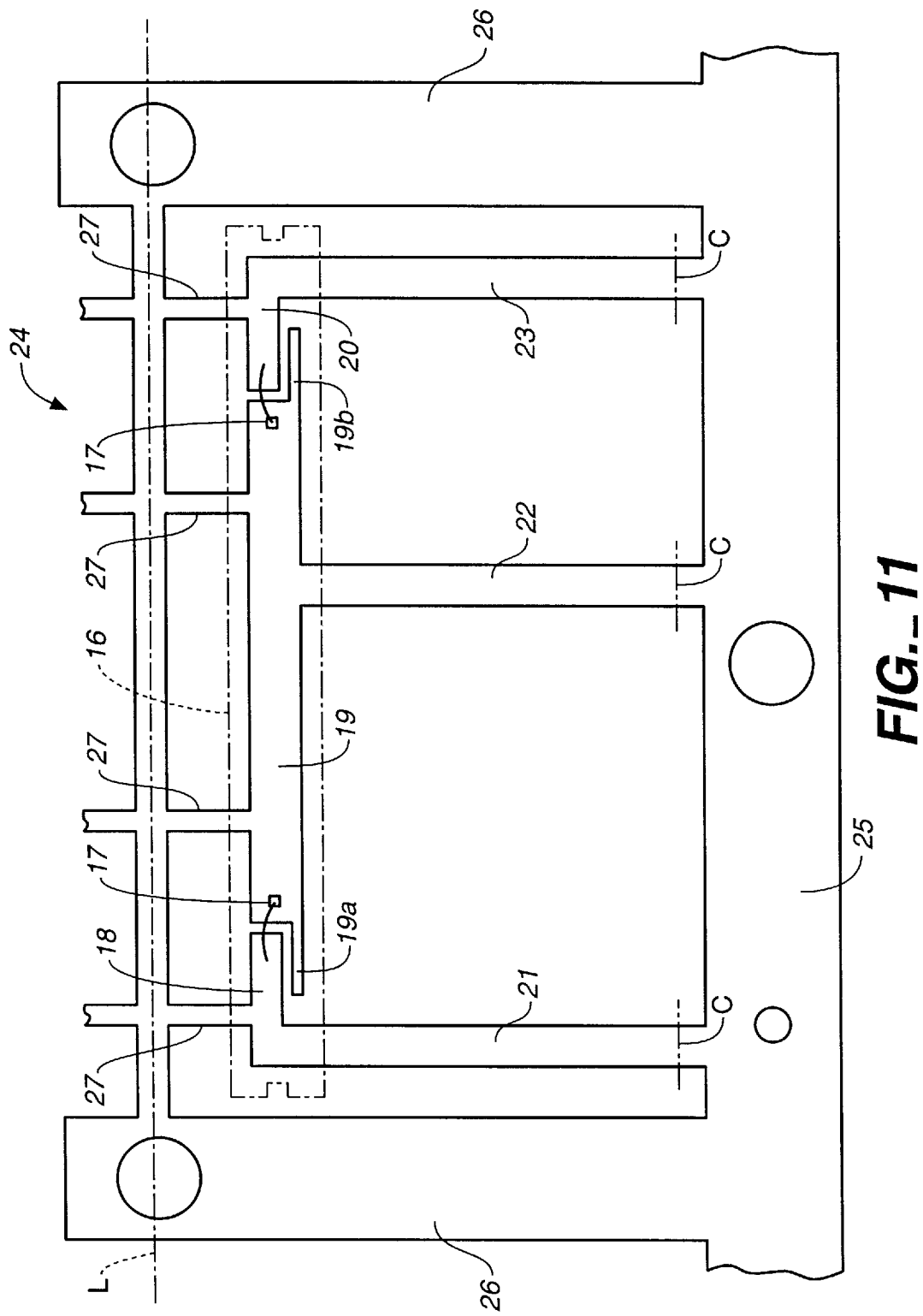
FIG._11

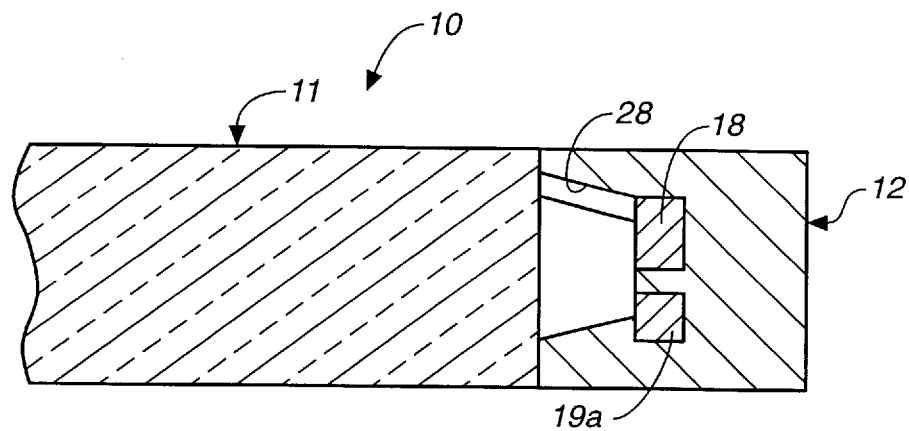
FIG._12
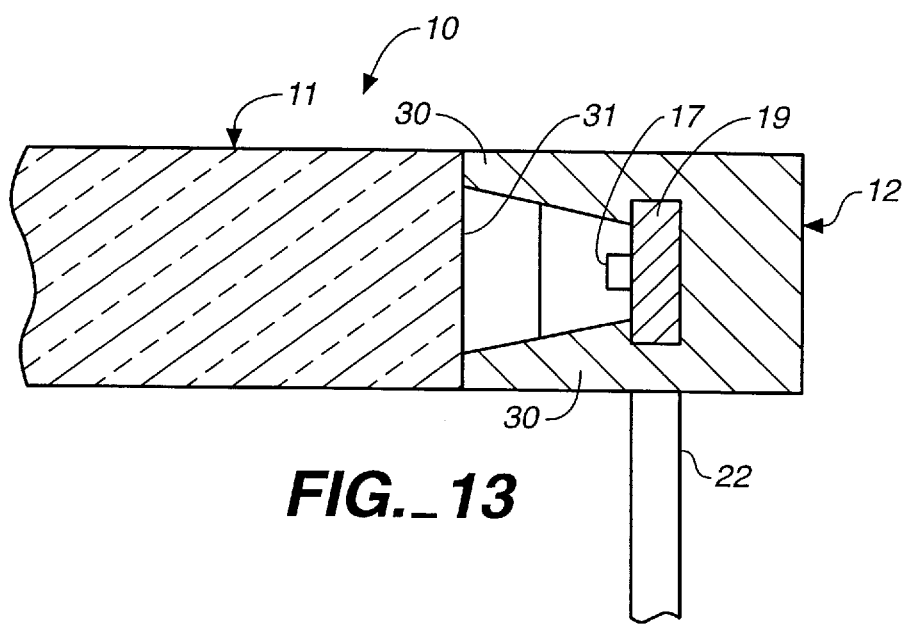
FIG._13

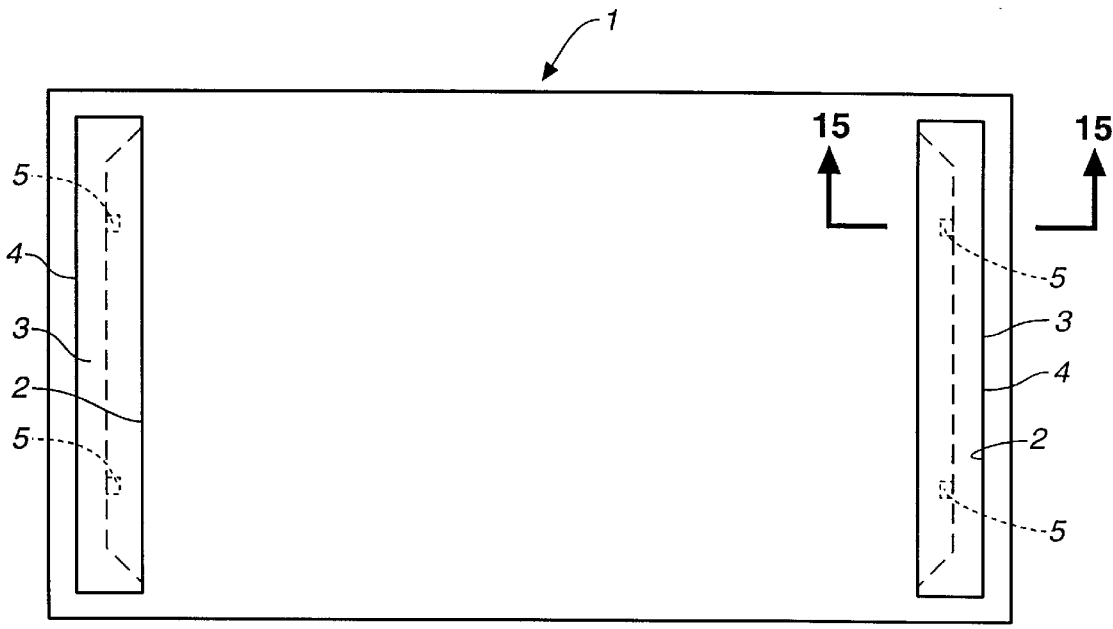
FIG._14
(PRIOR ART)
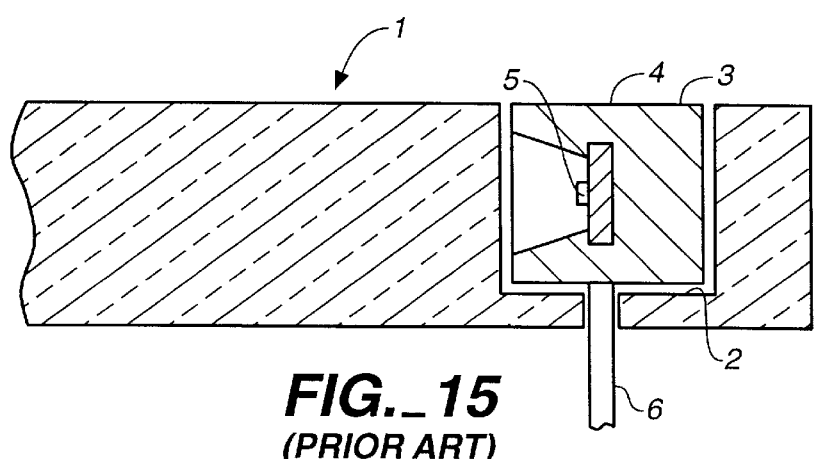
FIG._15
(PRIOR ART)

ILLUMINATOR WITH LIGHT-EMITTING SURFACE

BACKGROUND OF THE INVENTION

This invention relates to an illuminator of the so-called back lighting type such as a liquid crystal panel display device which does not emit light itself but is illuminated from behind so as to improve the visibility of a light-emitting surface.

Japanese Utility Model Publication Jikkai 4-14943 disclosed an example of such an illuminator, as shown in FIGS. 14 and 15, having indentations 2 formed at peripheral parts on the upper surface of a transparent or translucent light-conducting plate 1 with a uniform thickness and a light source device 3 inserted in each of these indentations 2. Each of these light source devices 3 is formed by providing LED chips 5 to the bottom part of a box-shaped reflector case 4 with an open front surface, filling the interior of the case with a transparent resin material, and providing lead terminals 6 protruding downward from the bottom surface of the reflector case 4. The light beams emitted from each light source device 3 is reflected by the inner surfaces of the reflector case 4, transmitted to the interior of the light-conducting plate 1, reaching every part of the light-conducting plate 1 by repeating total reflections at both its top and bottom surfaces, and eventually emitted out from its surface. As a result, although the light-conducting plate 1 has an extended surface area and the light source devices 3 occupy only a small portion of this area, it seems as if the entire surface of the light-conducting plate 1 is shining.

Because of this structure with light source devices 3 inserted in indentations 2 formed on the surface of the light-conducting plate 1, the following problems are encountered with the prior art illuminator of this type. Firstly, since gaps are inevitably left between the indentation 2 and the light source device 3, and since this gap is not the same from one illuminator to another, there are fluctuations in the amount of light introduced into the light-conducting plate 1 from the light source device 3. Since this gap between the indentation 2 and the light source device 3 may change longitudinally, the brightness of the light-conducting plate 3 may become irregular from one position to another on the plane of the plate 1, adversely affecting the quality of the product as a surface light-emitter. Secondly, the surface portions of the light-conducting plate 1 outside the indentations 2 are wasted, reducing the effective area of the light-emitting surface. When a surface light-emitter with a specified light-emitting area is required, this means that a larger illuminator must be incorporated and hence that the miniaturization of the overall product is inhibited.

SUMMARY OF THE INVENTION

It is therefore an object of this invention in view of the above to provide an illuminator with a light-emitting surface designed such that the illuminative characteristic of each product will be uniform and the effective light-emitting area can be increased.

An illuminator according to this invention, with which the above and other objects can be accomplished, may be characterized not only as comprising a light-conducting plate made of a transparent or translucent resin and a light source device for projecting light into this light-conducting plate through its side surface, but also as having an engagement mechanism by which a light source device can be automatically attached to the side surface of the light-conducting plate by merely pressing the light source device against the side surface of the light-conducting plate. The light source device according to this invention, unlike prior art devices, is not inserted into an indentation made in the light-conducting plate but is adapted to be attached to its side surface. Accordingly, the entire length of the light-conducting plate can be used as a light-emitting surface. As the light source device is pressed against and engaged to the side surface of the light-conducting plate, the front of the light source device comes into contact tightly with the side surface of the light-conducting plate without leaving any unwanted gap therebetween. The prior art problems of fluctuations in the gap from one illuminator to another can thus be eliminated. Because the light source device of this invention is attached to the side surface of the light-conducting plate, rather than being inserted into an indentation made therein, the lead terminals do not have to be passed through any throughholes made through the light-conducting plate. In summary, the light source device according to this invention can be installed more easily.

According to a preferred embodiment of the invention, the mechanism by which the light source device and the light-conducting plate are attached to each other includes engagement protrusions formed at both end parts of the light source device and a flexible and deformable hook which protrudes from the side surface of the light-conducting plate, and they are formed so as to prevent the light source device from becoming removed from or moving perpendicularly relative to the light-conducting plate when they are in a mutually engaged relationship. Thus, the light source device and the light-conducting plate can be not only engaged easily but also kept securely engaged to each other.

According to a preferred embodiment of the invention, furthermore, the light source device has an elongated rectangular box-shaped reflective case with an open front surface and a plurality of LED chips inside this reflective case. The engagement protrusions are on both longitudinal end parts of this reflective case. The light source device may also have forwardly protruding parts on its front surface at positions corresponding to the LED chips, and the side surface of the light-conducting plate may have indentations formed at positions corresponding to these forward protruding parts of the light source device.

Other features of this invention, as well as their effects will become clear from the description given below.

BRIEF DESCRIPTION OF THE DRAWINGS

The accompanying drawings, which are incorporated in and form a part of this specification, illustrate embodiments of the invention and, together with the description, serve to explain the principles of the invention. In the drawings:

FIG. 1 is a plan view of an illuminator with a light-emitting surface according to one embodiment of this invention;

FIG. 2 is a front view of a light source device used in the illuminator of FIG. 1;

FIG. 3 is an enlarged sectional view taken along line 3—3 in FIG. 2;

FIG. 4 is an enlarged sectional view taken along line 4—4 in FIG. 2;

FIG. 5 is an enlarged sectional view taken along line 5—5 in FIG. 2;

FIG. 6 is a sectional view taken along line 6—6 in FIG. 2;

FIG. 7 is a view taken along line 7—7 in FIG. 2;

FIG. 8 is a diagonal view of a hook;

FIG. 9 is a diagonal view of engagement protrusions corresponding to the hook shown in FIG. 8;

FIG. 10 is a side view of a hook and a corresponding engagement protrusion for showing their relative positions;

FIG. 11 is a plan view of a portion of a lead frame for the production of the light source device shown in FIGS. 2–7;

FIG. 12 is an enlarged sectional view taken along line 12—12 in FIG. 1;

FIG. 13 is an enlarged sectional view taken along line 13—13 in FIG. 1;

FIG. 14 is a plan view of a prior art illuminator with a light-emitting surface; and FIG. 15 is an enlarged sectional view taken along line 15—15 in FIG. 14.

DETAILED DESCRIPTION OF THE INVENTION

FIGS. 1–13 are referenced next to describe an illuminator 10 with a light-emitting surface according to a preferred embodiment of this invention. As shown in FIG. 1, this illuminator comprises a rectangular light-conducting plate 11 made of a transparent or translucent resin material and light source devices 12 attached to this light-conducting plate 11 directly along its mutually opposite shorter side edges. To be more precise, these light source devices 12 are directly on these side edges and, as will be explained below more in detail, they are adapted to become engaged and held on the side surfaces of the light-conducting plate 11 automatically by engaging means 13 when they are pushed in the direction of the side surfaces of the light-conducting plate 11. The aforementioned engaging means 13 for engaging and holding the light source device 12 to the light-conducting plate 11 comprises hooks 14 which are formed on the light-conducting plate 11 and engagement protrusions 15 formed at both end parts of the light source device 12.

As shown in FIGS. 2–7, the light source device 12 is generally structured similarly to prior art light source devices of a similar kind, having LED chips 17 disposed at the bottom (not in the sense of at the lowest position but in the sense of at the deepest part) of a horizontally elongated rectangular box-shaped reflector case 16. The reflector case 16 has a height which is approximately the same as the thickness of the light-conducting plate 11, and its length may be determined appropriately in view of the length of the shorter side edge of the rectangular light-conducting plate 11.

Three (the first, second and third) terminal plates 18, 19 and 20 are disposed on the bottom part of the reflective case 16. A first lead terminal 21, a second lead terminal 22 and a third lead terminal 23 extend downward respectively from the first, second and third terminal plates 18, 19 and 20.

FIG. 11 shows a lead frame 24 which may be used for producing the light source device 12 as described above, having the three terminal plates 18, 19 and 20 and the lead terminals 21, 22 and 23 connected to a side frame 25 and cross frames 26 through support leads 27. FIG. 11 shows only one unit portion of the lead frame 24 for the production of one light source device 12. Many such units are longitudinally connected, mutually separated by the cross frames 26, and arranged in two rows, symmetrically with respect to the line L. Protrusions 19a and 19b are formed integrally at both ends of the second terminal plate 19, extending overlapped in the vertical direction by and under the first and third terminal plates 18 and 20, respectively.

The LED chips 17 are bonded onto the second terminal plate 19 at its both end parts, and upper-surface electrodes on the LED chips 17 are each connected by wire bonding to the first terminal plate 18 or the third terminal plate 20. In other words, the two LED chips 17 of this light source device 12 are electrically connected in parallel.

The reflector case 16 is formed by molding in the region indicated by broken line in FIG. 11. After the bonding and wire bonding steps are carried out, as described above, the interior of the case may be filled with a transparent resin or a resin material mixed with a dispersant. Thereafter, parts of the lead frame, and in particular the parts forming the lead terminals are solder-plated, and the support leads 27 are cut along the outer surface of the reflective case 16. The lead terminals 21, 22 and 23 are cut along lines C.

The aforementioned protrusions 19a and 19b serve to disperse and absorb the shearing strain to which the light source device 12 is subjected through the lead terminals 21, 22 and 23 when it is inserted into the light-conducting plate 11, thereby effectively preventing the generation of cracks between the terminal plates 18, 19 and 20 and the resin material forming the reflective case 16.

Because of the dimensional limitations in the vertical direction (the direction of the width) of the terminal plates 18, 19 and 20, the bonding wires extending from the LED chips 17 must be bonded to positions which are above the center horizontal line of the second terminal plate 19. In order to make it possible to use a prior art capillary for such bonding ("the second bonding"), upward indentations 28 are formed from the inside on the upper wall 16a of the reflective case, as shown in FIGS. 2 and 3, where the second bonding is carried out. Since the reflective case 16 is produced by resin molding, as explained above, such indentations can be provided easily by effecting only small changes in the mold.

As shown in FIG. 11, the lead frame 24 is so designed that the three lead terminals 21, 22 and 23 and the support leads 27 extend from the terminal plates 18, 19 and 20 in mutually opposite directions. As a result, when the lead terminals 21, 22 and 23 are solder-coated, say, by a solder dip method, after the LED chips are bonded and the interior space of the reflective case is filled with a resin, the heat from the molten solder can be effectively dissipated through the support leads 27, thereby preventing separation of the lead terminals 21, 22 and 23 from the reflective case 16 due to thermal strain.

In order to prevent the separation of the terminal plate 18, 19 and 20 from the resin material of the reflective case 16 when the support leads 27 are cut off along the outer surface of the reflective case 16, thickened parts 29 are also provided as shown in FIGS. 2 and 4 on the upper wall 16a of the reflective case 16 at positions corresponding to the support leads 27.

As shown in FIGS. 2, 5, 6 and 13, furthermore, the forward protrusions 30 of the box-shaped reflective case 16 are further extended forward in a semicircular form where the LED chips 17 are provided. The opposite side surface of the light-conducting plate 11 is correspondingly provided with indentations 31 such that, when the light source device 12 is inserted into the light-conducting plate 11, the light emitted from the LED chips 17 will be prevented from directly leaking out from the surface of the light-conducting plate 11 near the LED chips 17. This prevents the areas around the LED chips 17 from becoming more strongly illuminated.

On each end of the light source device 12, or on each end part of the reflective case 16, engagement protrusions 15 are integrally formed, as shown in FIGS. 8, 9 and 10 as parts of an engaging means 13, collaborating with the hook 14 formed on the side surface of the light-conducting plate 11 for automatically engaging the light source device 12 with the light-conducting plate 11 by merely pushing the light source device 12 against the side surface of the light-conducting plate 11.

As shown in FIG. 9, two protrusions 15 are formed at each end part of the reflective case 16, one above the other with a gap 32 of a specified width in between. These protrusions 15 are formed on the frontal (towards the light-conducting plate 11) part of the side surface from its center and a slope 15a is formed on the front side of each. The mutually opposite surfaces of the two protrusions 15 (facing the gap 32) include sloped parts 15b such that their separation increases towards the front.

Each of the hooks 14, formed on a side surface of the light-conducting plate 11, as best shown in FIG. 8, comprises an axis part 14a which is elastically deformable and flexible in the direction of the arrow and a hooking part 14b formed at the tip of the axis part 14a, having a sloped guide surface 141 and an engagement surface 142, a guide wall 143 of a specified thickness protruding horizontally from the middle (in the vertical direction) of the sloped guide surface 141 and a backward protruding wall 144 of a specified thickness protruding similarly but towards the base of the hook 14. The thickness of the guide wall 143 and the backward protruding wall 144 is determined according to the width of the gap 32 between the aforementioned two engagement protrusions 15 formed on the reflector case 16.

As the light source device 12 thus formed is pushed against one of the side surfaces of the light-conducting plate 11, as shown in FIG. 10, the slopes 15a on the engagement protrusions 15 on the reflective case 16 are pressed against the sloped guide surfaces 141 of the hooking part 14b of the hook 14. This causes the hook 14 to elastically flex as shown by the arrow in FIG. 8, and the engagement surface 142 of the hook 14 is automatically engaged to the back 15c of the protrusions 15. Since the gap 32 between the upper and lower protrusions 15 is wider towards the front, the guide wall 143 of the hook 14 can be easily received thereinto and guided therethrough. The backward protruding wall 144 on the hook 14 is so designed as to fit exactly in the gap 32 when the hook 14 engages with the engagement protrusions 15 as shown in FIG. 1. With the engagement surface 142 of the hook 14 and the back surfaces 15c of the protrusions 15 on the reflective case 16 properly designed, the front of the light source device 12 matches exactly with side surface of the light-conducting plate 11 without leaving any unwanted gap therebetween.

As shown in FIGS. 8 and 9, an indentation 33 is formed by the axis part 14a of the hook 14 so as to increase the effective length of the axis part 14a and to make it easier to flex elastically in the direction of the arrow.

Once engaged, the light source device 12 does not fall off easily from the light-conducting plate 11 because of the engagement between the engagement surface 142 of the hook 14 and the back surfaces 15c of the engagement protrusions 15. The engagement of the backward protruding wall 144 inside the gap 32 between the two engagement protrusions 15 prevents a vertical displacement of the light source device 12 with respect to the light-conducting plate 11 as well as its twisting motion.

In summary, the illuminator 10, thus structured, is characterized wherein its light source devices 12 can be easily installed onto the light-conducting plate 11 simply by pushing them on its side surfaces. As can be understood by comparing FIGS. 1 and 14, the light-conducting plate 11 of the illuminator 10 according to this invention does not have the wasteful edge regions which do not emit light and hence has an effectively larger light-emitting surface area. In other words, a smaller light-conducting plate can provide the same light-emitting area as compared to the light-conducting plate of a prior art illuminator. Moreover, the light source device according to this invention is itself designed such that its lead terminals 21, 22 and 23 extending therefrom can be easily inserted into a circuit board.

The example illustrated above is not intended to limit the scope of the invention. Many modifications and variations are possible within the scope of the invention. Since the invention relates to the mechanism by which a light source device can be attached to a light-conducting plate, the structure of the light source device itself can be modified extensively. For example, the number of LED chips, whether they are to be connected electrically in series or in parallel and it may be determined selectably, depending on each situation, whether the thickened parts as described above should be provided to the reflective case 16 corresponding to the positions of the LED chips. Even the mechanism for automatically engaging the light source device with the light-conducting plate merely by pushing is not limited to the disclosure given above. It is preferable, however, that the light source device is removed from the light-conducting plate in an outward direction and that they are attached so as to prevent the light source device from moving vertically (in the direction of the thickness of the light-conducting plate).

What is claimed is:

1. An illuminator with a light-emitting surface comprising:

a light-conducting plate having a thickness and a side surface;

a light source device for projecting light into said light-conducting plate through said side surface; and an engagement mechanism by which said light source device can be automatically engaged directly to said side surface if said light source device is pressed against said side surface, said engagement mechanism including engagement protrusions formed at both end parts of said light source device and a flexible and deformable hook protruding from said side surface of said light-conducting plate within said thickness.

2. The illuminator of claim 1 wherein said light source device comprises an elongated rectangular box-shaped reflective case with an open front surface and a plurality of LED chips inside said reflective case, said engagement protrusions being on both longitudinal end parts of said reflective case.

3. The illuminator of claim 2 wherein said light source device has forwardly protruding parts on a front surface at positions corresponding to said LED chips and wherein said side surface of said light-conducting plate has indentations formed corresponding to said forward protruding parts of said light source device.

4. The illuminator of claim 1 wherein said light-conducting plate has main surfaces and said engagement protrusions and said hook are formed so as to prevent said light source device from becoming removed from or moving perpendicularly to said main surfaces of said light-conducting plate when engaged with said light-conducting plate.

5. The illuminator of claim 4 wherein said light source device comprises an elongated rectangular box-shaped reflective case with an open front surface and a plurality of LED chips inside said reflective case, said engagement protrusions being on both longitudinal end parts of said reflective case.

6. The illuminator of claim 5 wherein said light source device has forwardly protruding parts on a front surface at positions corresponding to said LED chips and wherein said side surface of said light-conducting plate has indentations formed corresponding to said forward protruding parts of said light source device.

* * * * *